(12) United States Patent
Zheng et al.

(10) Patent No.: US 11,546,372 B2
(45) Date of Patent: Jan. 3, 2023

(54) METHOD, SYSTEM, AND APPARATUS FOR MONITORING NETWORK TRAFFIC AND GENERATING SUMMARY

(71) Applicant: INSTITUTE OF INFORMATION ENGINEERING, CHINESE ACADEMY OF SCIENCES, Beijing (CN)

(72) Inventors: Chao Zheng, Beijing (CN); Qingyun Liu, Beijing (CN)

(73) Assignee: INSTITUTE OF INFORMATION ENGINEERING, CHINESE ACADEMY OF SCIENCES, Beijing (CN)

( * ) Notice: Subject to any disclaimer, the term of this patent is extended or adjusted under 35 U.S.C. 154(b) by 958 days.

(21) Appl. No.: 16/331,587

(22) PCT Filed: Sep. 6, 2017

(86) PCT No.: PCT/CN2017/100676
§ 371 (c)(1),
(2) Date: Mar. 8, 2019

(87) PCT Pub. No.: WO2018/054217
PCT Pub. Date: Mar. 29, 2018

(65) Prior Publication Data
US 2019/0253436 A1   Aug. 15, 2019

(30) Foreign Application Priority Data

Sep. 21, 2016   (CN) .......................... 201610839140.7

(51) Int. Cl.
*G06F 21/56*    (2013.01)
*H04L 9/40*     (2022.01)
(Continued)

(52) U.S. Cl.
CPC ...... *H04L 63/145* (2013.01); *G06F 16/24568* (2019.01); *G06F 17/16* (2013.01);
(Continued)

(58) Field of Classification Search
CPC ................. H04L 63/145; H04L 9/0643; H04L 9/3236; H04L 63/1408; H04L 2209/08; G06F 16/24568; G06F 17/16; G06N 7/02
(Continued)

(56) References Cited

U.S. PATENT DOCUMENTS 7,707,088 B2 *  4/2010  Schmelzer .......... G06F 21/6209
                                                 709/224
7,774,290 B2    8/2010  Marfatia
(Continued)

FOREIGN PATENT DOCUMENTS

CN   106407400       2/2017
CN   106407400 A  *  2/2017   ....... G06F 16/24568

*Primary Examiner* — Jorge L Ortiz Criado
*Assistant Examiner* — Kevin Ayala
(74) *Attorney, Agent, or Firm* — SV Patent Service (57) ABSTRACT

The present invention provides a method, a system, and a device for a hash generation and network traffic detection. It uses a method of storing intermediate calculation results to perform hash calculation for streaming data, and uses a matrix multiplication operation as a strong hash algorithm to reduce memory occupation. The present invention can generate hash in real time in the case of streaming data comprising defects, unordered, and overlapping, which is suitable for detecting files from network traffic, and is applicable to virus detection, intrusion detection, data anti-leakage, network content review, digital forensics, digital rights protection, and other fields.

15 Claims, 2 Drawing Sheets

(51) Int. Cl.
*G06N 7/02* (2006.01)
*G06F 16/2455* (2019.01)
*H04L 9/06* (2006.01)
*G06F 17/16* (2006.01)
*H04L 9/32* (2006.01)

(52) U.S. Cl.
CPC ............. *G06N 7/02* (2013.01); *H04L 9/0643* (2013.01); *H04L 9/3236* (2013.01); *H04L 63/1408* (2013.01); *H04L 2209/08* (2013.01)

(58) Field of Classification Search
USPC .......................................................... 726/24
See application file for complete search history.

(56) References Cited

U.S. PATENT DOCUMENTS

| | | | |
|---|---|---|---|
| 10,515,214 B1* | 12/2019 | Vincent | G06F 21/562 |
| 10,606,844 B1* | 3/2020 | Kumar | G06F 21/565 |
| 2006/0288206 A1* | 12/2006 | Kojima | H04L 63/0442 |
| | | | 713/165 |
| 2008/0027895 A1* | 1/2008 | Combaz | G06F 16/335 |
| 2008/0033942 A1* | 2/2008 | Kao | G06F 16/9014 |
| 2009/0276245 A1 | 11/2009 | Cziria et al. | |
| 2016/0191530 A1* | 6/2016 | Jain | H04L 45/74 |
| | | | 726/4 |
| 2016/0191678 A1* | 6/2016 | Brandeburg | H04L 9/3236 |
| | | | 370/392 |
| 2018/0191679 A1* | 7/2018 | Mulka | H04L 63/0236 |
| 2019/0236661 A1* | 8/2019 | Hogg | G06F 16/9537 |
| 2020/0186548 A1* | 6/2020 | Alagar | H04L 63/145 |

\* cited by examiner

3072:BbU+EXaNvEIsbsJTtjR1K9wT2cFmSPWIE0Iu5Ij9tdkPy8Lfbv5a1ecSy+DnxaDTtxfTXN
yBQruxGmBcslUWyVbGa1ecSy+DnxaDTtxfTXAiIrQanItZ251L3+m7XmEA+Phv26xq5qCs2
PEBeRaGSlrDIXGaepWxSmvmJyKlEufW2rhG4aDL7PpPW5VQUeIFSQvUbSaJGqR7JZNEgn
mcnaiatvjMWzEa/UgZcpqoH[0:825307]#12288:hr1FbST0sPW4RnDtotxDykDKDtotxefM3+S
doh7maJWSfWzNkVFo6kao9XuH[0:825307]

Figure 4

METHOD, SYSTEM, AND APPARATUS FOR MONITORING NETWORK TRAFFIC AND GENERATING SUMMARY

TECHNICAL FIELD

The invention belongs to the technical field of computer security, and relates to a method, a system and a device for generating a summary and detecting network traffic.

BACKGROUND OF THE INVENTION

With the ever-increasing network traffic, identifying traffic data for the data leakage prevention (Data Leakage Protection, DLP), network defense and other security requirements increasingly important. For example, Trojans, viruses, porn videos, and internal files are identified from network traffic. If they can be identified during transmission, they can be examined and disposed of at an early stage.

To identify data in traffic, the general approach is to generate a summary of the data in the network. The current methods for generating summaries for data fall into two main categories:

The first type, cryptographic hash algorithms, such as MD5, SHA256 algorithms, etc. Due to the avalanche effect when the data changes, minor modifications to the file will cause the hash values to change greatly, so it cannot be used for identifying similar files.

The second type, context-triggered piecewise hashing, such as ssdeep, sdhash, tlsh, Nilsimsa, mrsh-v2, and so on. Among them, ssdeep, also known as fuzzy hash, is the most widely adopted context-triggered piecewise hashing algorithm, which is used by institutions such as the National Institute of Standards and Technology, VirusTotal, and others.

Fuzzy hashing algorithm is based on hash slicing, with a weak hash function (rolling hash, referred rh) calculating a length of a continuous byte hash value (calculation length referred to as slice calculation window).

When the weak hash value rh satisfies the slicing condition (Equation 2), the data is sliced at this position.

The slicing conditions determine the average number of slices, the method of calculating the initial block size $b_{init}$ as shown in Equation 1, the slicing condition is shown in Equation 2:

$$b_{init} = b_{min} 2^{\lfloor \log_2\left(\frac{n}{Sb_{min}}\right) \rfloor}$$ Eqn. (1)

$$rh \bmod blocksize = blocksize - 1$$ Eqn. (2)

wherein $b_{min}$, a constant, is the minimum slice value; ssdeep is set to be 3 in the algorithm; n is the length of the input file; S, a constant, is the length of the expected hash string; ssdeep is set to be 64 in the algorithm, mod is modulo operation; the blocksize initial value is $b_{init}$.

Subsequently, a low collision rate hash function (called strong hashing in ssdeep, using FNV algorithm) is used to calculate a hash value for each slice, such that local file changes only affects one or two slices, and do not cause the hash values the entire file to change completely. In practice, the similarity between two files is measured by using the edit distance between the fuzzy hash values of the two files.

The byte streams of the files/data transmitted in the network traffic can be obtained by traffic capture, protocol parsing, and decompression. However, there are a large number of complex processing situations in network traffic based on application protocol, such as online video playback, network disk file downloading, etc. Such type of data has a lot of unordered and incomplete capture situations.

Therefore, the traditional fuzzy hash algorithm is suitable for the processing of offline data (identifying almost identical files using context triggered piecewise hashing, 2006), but the presently transmitted streaming data have encountered the following problems:

1) Data arriving out of order: due to transmission technologies such as multi-thread transmission, the byte stream of a file may be unordered, that is, the data located at the front of the file arrives later, while the data at the back of the file arrives first. The traditional solution for the out-of-order problem is to cache data, but this will undoubtedly increase memory overhead.

2) Missing initial length: some network transport protocols, such as HTTP 1.1, allow the total length of the file not to be declared before the file transfer begins. The existing fuzzy hash algorithm requires a total file length before the calculation to set a fuzzy hash trigger condition. Thus, files that are being transmitted in the network without an initial length cannot be calculated.

3) File defect: deep packet inspection systems, such as Data Leak Prevention System (DLP) and Network Intrusion Detection System (NIDS), have the ability to restore files from network traffic, but because of many scenarios, such as DDOS attacks, sudden traffic surges, the files captured may be incomplete. Existing hash algorithms cannot summarize such files.

4) Streaming processing: the traditional fuzzy hashing algorithms need to read the files multiple times, and constantly adjust the slicing triggering condition to generate a hash value of appropriate length. This is not a problem for the file stored on the disk. But in dealing with a huge network traffic, there is only one processing opportunity, this method cannot be applied to streaming data being transmitted.

SUMMARY OF THE INVENTION

In view of this, the present invention provides a method, a system and a device for generating a summary for streaming data in real time and examining the network traffic.

Since the presently disclosed summary generation method is directed to streaming data compared with the conventional Fuzzy Hash algorithm, the presently disclosed algorithm is referred as Stream Fuzzy Hash (SFH) algorithm. Correspondingly, the data slice in the file object of the presently disclosed arithmetic processing is called SFH calculation context (hereinafter referred to as calculation context).

The technical solution of an embodiment of the present invention is as follows:

A method for generating a summary, comprising:

1) searching an interval index in the calculation handle to find a calculation context in a left neighbor of an input data block; and if the data block has no left neighbor, initializing a new calculation context;

2) retaining first w−1 bytes of the input data block into a buffer in the calculation context, resetting a weak hash state and a strong hash state, and calculating a weak hash value for each byte of the input data block from the weak hash state and updating the strong hash state, wherein w is a sliding window value of a weak hash function;

3) finding a reset point when the calculated weak hash value satisfies a slicing condition; if a first reset point is found in the calculation context, saving the strong hash state to the partial strong hash value, resetting the strong hash state; if it is not the first reset point, calculating a strong hash value of a slice divided by two reset points, until end of slicing; calculating to a strong hash state of the data between a last reset point and an end position of the input data block, completing updating of the calculation context;

4) saving the updated calculation context the interval index, find the computation context of already entered data in the interval index, and merging adjacent context calculations; and 5) traversing the interval index, splicing hash values therein and outputting thereof.

Further, each file used in the calculation in step 1) is assigned an independent calculation handle for storing state information of the streaming calculation including the interval index, wherein the interval index refers to a data structure that can look up a data interval (start and end offsets), which can be implemented with a common lookup structure, such as interval trees, linked lists, arrays, heaps, red-black trees, and so on.

Further, in step 2), the strong hash state is updated by Galois Field matrix multiplication, including:

Defining the initial matrix A, B:

$$A = \begin{pmatrix} X & 1 \\ 1 & 0 \end{pmatrix} B = \begin{pmatrix} X & X+1 \\ 1 & 1 \end{pmatrix}, \quad \text{eqn. (3)}$$

wherein X is $F_{2^n}$ an irreducible n-order determinant in the domain (near generation algebra), wherein the mapping relationship is defined as:

$\pi = \{0,1\} \rightarrow \{A,B\}$ $0 \rightarrow A$ $1 \rightarrow B$ wherein strong hash value of the binary streaming data $x_1 x_2 L\ x_k$ is expressed as $\pi(x_1)\pi(x_2)K\ \pi(x_k)$.

Further, in step 3), after the context calculation is updated, if a strong hash value of a recorded SFH handle exceeds a preset summary length, performing a tuning operation, comprising:

using equation (4) to adjust blocksize parameter in equation (2) as k*blocksize, thereby selecting a new slice position, and merging strong hash values between new slice positions in accordance with matrix multiplication, $$rh\ \text{mod blocksize} = \text{blocksize} - 1 \quad \text{eqn. (2)}$$

$$rh\ \text{mod}(k*b) = k*b - 1 => r\ \text{mod}\ b = b - 1 \quad \text{eqn. (4)}$$

wherein rh is a weak hash function, mod is a modulo operation, b is an abbreviation for blocksize, and k is a natural number.

Further, in step 4), the step of merging adjacent calculation contexts can include:

4-1) updating w−1 bytes of the calculation context p and its right neighbor n stored in the buffer;

4-2) calculating a matrix product of a strong hash state value shs of p and part of a strong hash value pshv of n;

4-3) if p does not include a reset point, updating the status strong hash value shs of p using the matrix product; otherwise, updating part of the status strong hash state value pshv of n using the matrix product; and 4-4) splicing the strong hash values of p and n updated in step 4-3).

Further, in step 4-4) the strong hash value of each slice can be a matrix of order n, wherein each element in the matrix has an m-bit value, wherein the step of splicing includes splicing the n*n elements of the matrix to form a value of n*n*m bit and intercepting characters mapped to one or more bytes.

Apparatus for generating a summary includes a receiver; a memory; and a processor, wherein the receiver is configured to receive data to be calculated, wherein the memory is configured to store the received data to be calculated, program instructions for performing the steps of the above disclosed method, and hash values generated, wherein the processor is configured to execute program instructions stored in the memory to perform the steps of the above disclosed method.

A computer readable storage medium stores a summary generating program. When the summary generating program is executed by a computer, the summary generating program implements steps of the above disclosed method.

A method for detecting network traffic based on summary generated by the above method includes:

1) generating, in each of target file sets to be matched, a hash value based on the above described summary generating method, and storing the hash value as a summary list of the target file set to be matched;

2) generating a hash value based on the summary generating method for the to-be-detected network packet parsed from the network traffic; and 3) matching the hash value generated in step 2) with the hash value in the summary list to complete detection of network traffic.

Further, step 3) can include filling the ith defect in the generated hash value $s_1$ with $n_i$ spaces to obtain $s'_1$, wherein $n_i$ is calculates using equation (5), wherein Gapbytes represents summary length of the defect, ComputedBytes is file length of the already input file, wherein $|s_1|$ is length of the hash value $s_1$: calculating a corrected edit distance $e(s_1,s_2)$ of $s_1$ and $s_2$ using Equation 6, wherein LE is the editing distance, $|s'_1|$ indicates the length of hash value $s'_1$, $s_2$ is a hash value in the summary list of the target file collection to be matched; assessing similarity M of $s_1$ and $s_2$ using Equation 7 by a score between 0~100, wherein a higher score represents higher similarity, and a score of 100 represents being completely identical.

$$n_i = \left\lfloor \frac{Gapbytes[s_1]}{ComputedBytes} \right\rfloor, \quad \text{eqn. (5)}$$

$$e(s_1, s_2) = LE(s'_1, s_2) - \frac{|s_1|(|s'_1| - |s_1|)}{|s'_1|}, \quad \text{eqn. (6)}$$

$$M = 100 - \frac{100 e(s_1, s_2)}{|s'_1| + |s_2|}. \quad \text{eqn. (7)}$$

A network traffic detection system based on the above described summary generation method includes: a summary list storage module configured to generate a hash value for each file in a target file set to be matched based on the summary generation method, and to store the hash value in a summary list; a packet parsing module configured to parse network packets to be detected from the network traffic; a summary generating module configured to generate a hash value according to the summary generating method for each network packet to be detected; and a summary matching module configured to match the hash value generated from the network packet to be detected with the hash value in the summary list.

Further, the network traffic detection system can be deployed at a user's Internet gateway, which obtains network traffic of an internal network and the Internet through a method of serial connection, splitting, or port mirroring. Or, the network traffic detection system can be deployed in an internal gateway, a proxy server, a VPN gateway, which obtains network traffic of the internal network and the internet by installing a plug-in.

The benefits of the presently disclosed method, device, and apparatus can include one or more of the following:

(1) Streaming summary method. The scrambled blocks in the streaming data can be independently processed into SFH computation context, which removes the need for sequencing cache data in SFH. The hash data blocks that are out of sequence can be organized by calculated context using an interval index, which can efficiently find computation context where the unordered data blocks belong, enabling real-time calculation of the scrambled data.

(2) Improvements in memory usage. The present invention applies two matrices representing 0/1 bits and uses matrix multiplication of Galois Field as a strong hash function to reduce file buffering. Since it has the property of satisfying the combination law but not satisfying the commutative law, the calculation of the data before slicing can be accomplished by matrix multiplication. The transformation of the Tillichi-Zemor hash algorithm and its application in fuzzy hash calculations is the first of its kind.

(3) The appropriate summary length can be generated without repeated calculations. Also based on the combination law binding matrix multiplications, when there are too many slices generated, the slicing conditions of weak hash can be adjusted, the strong hash values can be combined, in order to achieve tuning of the summary length, generating the appropriate summary length. The time complexity for calculating the fuzzy hash is reduced from $O(n*\log(n))$ to $O(n)$.

(4) The ability to summarize defective data (i.e., incomplete) and to retain the correlation with the complete data.

DETAILED DESCRIPTION OF IMPLEMENTATIONS

The present disclosure provides a method, a system, and a device for generating a summary and detecting network traffic, which can generate a summary in real time in streaming data comprising defect, out of order, and overlap, which are suitable for detecting files from network traffic, which are applicable to the field of virus detection, intrusion detection, data leakage prevention, network content review, digital forensics, and digital copyright protection.

Compared with the conventional Fuzzy Hash algorithm, the presently disclosed summary generation method is directed to streaming data. Thus, the presently disclosed algorithm is referred as Stream Fuzzy Hash (SFH) algorithm. Correspondingly, the data slice in the file object of the presently disclosed arithmetic processing is called SFH calculation context (hereinafter referred to as calculation context).

Figure 1:
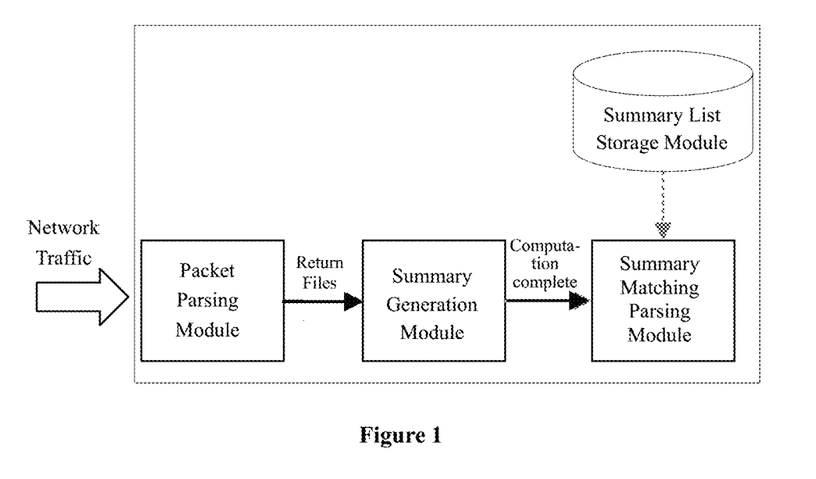
FIG. 1 is a schematic diagram of network traffic detection system in accordance to some embodiments of the present invention.

The present invention provides a network traffic detection system, as shown in FIG. 1, which mainly includes:

a summary list storage module that calculates a hash value based on an SFH algorithm for each file of the target file set to be matched and stored as a summary list;

a packet parsing module for parsing the network traffic (including reducing link, protocol decoding and decompression) to give a network packet to be detected;

a summary generating module that calculates a hash value according to an SFH algorithm for each network packet to be detected; and a summary matching module that calculates a hash value with the hash value matches the summary list.

The above system can be deployed at the user's Internet gateway to obtain network traffic of the internal network and the Internet through a serial connection, splitting or port mirroring; or can be deployed in the internal gateway, proxy server, VPN gateway, and obtained by plug-in mounting. Network and internet network traffic.

The network traffic detection method of the present invention is described in detail below by taking the above system deployed at the user's Internet exit as an example.

First, a summary list of the target file set to be matched is configured in the summary list storage module.

The set of target files to be matched to the user, because the target file is already stored on the disk, is a simplified case of streaming, that is, no out-of-order, no missing streaming. A summary of each file in the set can be generated by using the streaming data summary generation method in the present invention to obtain a summary list, and the list is configured in the summary list storage module of the above system. The files in the set of target files may be a file of great value to the user for data leakage prevention; it may also be a sample file of a known virus or Trojan for intrusion detection. The differences between application scenarios do not affect the process of summary generation.

The second step is to restore network traffic. The packet parsing module performs link restoration, protocol parsing, and decompression on the network packet to be detected captured from the network traffic. A specific file format can be identified by a URL, network protocol information (such as an HTTP header) or a file header signature, or any protocol payload in the network can be treated as a file to be detected. Specifically, the file to be detected is selected according to different application scenarios:

1) In the virus detection scenario, the email attachment and the file downloaded by HTTP can be used as the file to be detected according to the transmission protocol. The set of target files to be matched is a sample of a known virus or Trojan file.

2) In the intrusion detection scenario, the control commands or scripts can be used carried in the protocols such as Telnet and FTP as the files to be detected. The set of target files to be matched is a known control command or script.

3) In the data leakage prevention scenario, MS Word, MS can be identified by the signature of the file header. Power Point, PDF and other format documents, as a file to be detected, such as detecting the upload file of the network disk. The set of target files to be matched is a document that is valuable to the user.

4) In the network content review scenario, the data of a specific site may be selected as a file to be detected through a URL, or the file to be detected may be identified according to a file feature. The data set to be matched may not be required, and only the user access behavior is recorded.

5) In the digital forensics scenario, on the basis of identifying the various types of documents through the feature code of the file header, the image and the video can be identified by extending the feature code or relying on HTTP header information (such as a Content-type field) as a file to be tested. The set of target files to be matched is digital files (such as child pornography and financial documents) held by law enforcement agencies.

6) In the digital copyright protection scenario, multimedia data or software installation packages transmitted by various transmission protocols (such as BT, HTTP, HLS, etc.) can be used as files to be detected, such as detecting multimedia data streams of an online on-demand website. The set of target files to be matched is copyrighted data of the above type. Preferably, a copyright website/user list can be established, and only the files transmitted by the website/user outside the list can be calculated to reduce the processing pressure.

The third step is the streaming summary calculation. Since there are multiple files concurrently transmitted in the network traffic, it is necessary to allocate a separate SFH calculation handle for each file to be transferred. The SFH calculation handle is a data structure allocated in the memory for storing the interval index and the input accumulation. Status information of the flow calculation such as the length and the number of reset points. For an input packet, after a protocol analysis, decompression and other operations, according to the association file belongs to the protocol information, such as the same file or HTTP download process the same TCP connection. If the protocol information of the current message cannot be associated with any previous message, it is used as a new file to create a new SFH calculation handle for it. Otherwise, use the previous calculation handle. The SFH algorithm is applied to the SFH calculation handle and the input data block.

Figure 2:
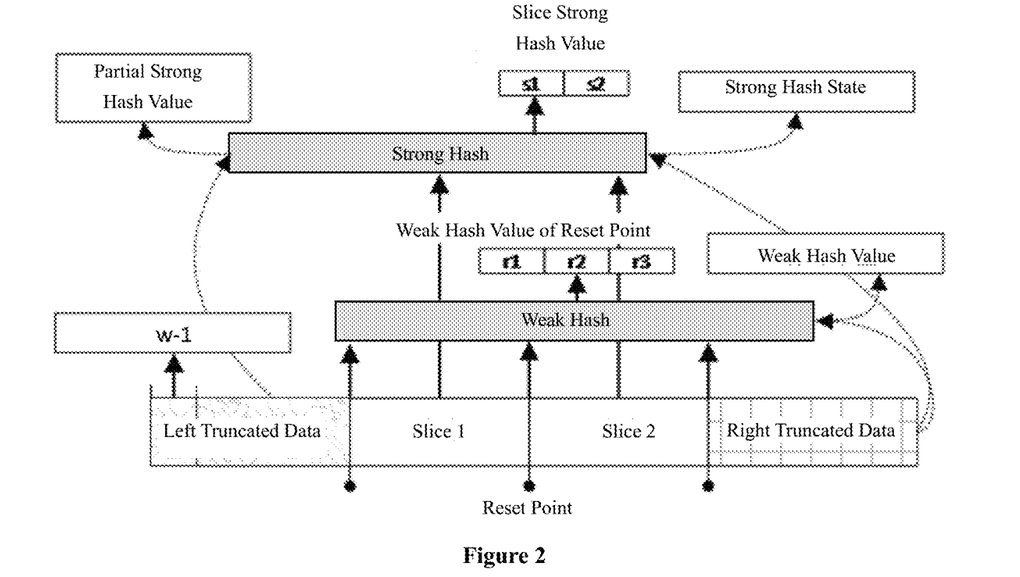
FIG. 2 is a schematic diagram of streaming data processing structure in accordance to some embodiments of the present invention.

In the SFH algorithm, an input data block of any offset, as shown in FIG. 2, may be divided into three parts:

1) Slicing. The data points between two reset (reset point), can be directly calculated matrix product of the slice, i.e., a strong hash value (strong hash value of slices);

2) The left truncated data (marginal) is the data from the beginning of the data block to the first reset point. The fuzzy hash value cannot be directly calculated. The data of the first w−1 bytes needs to be retained in the buffer. A matrix product (mbuffer) can calculate the remaining bytes (i.e. the bytes between byte w and the reset point), i.e., the strong part of the hash value (partial strong hash value);

3) Right truncated data (Truncated) is the data from the last reset point in the data block to the end position of the data. It is part of the slice that has not yet reached the full, and cannot directly calculate the fuzzy hash value. A partial matrix product is calculated, that is, the strong hash state;

The complete processing flow mainly includes the following basic operations (the multiplication and product in the following refer to the matrix multiplication of Galois Field):

A) Updating operation. The input is a data block and the calculation context of its left neighbor. If the data block has no left neighbor (when the offset is 0 or out of order), it is a newly initialized calculation context (or initializing one new calculation context).

For an input data block, s points to the starting position of the data block, as follows:

a) The first w−1 bytes are reserved in the buffer, and s is offset to the right by w−1 bytes.

b) Weak hash reset state (i.e., set to 0), a strong hash reset state (i.e., arranged in a matrix A in Equation 3); and c) s is offset to the right by one byte, and s points to the weak hash value and strong hash value of the byte;

Specifically: use the rolling in the previous article weak hash algorithm to calculate the hash value of the hash state and updates the weak (rolling hash state), while using the new strong hash algorithm (the Galois Field matrix multiplication) strong hash update status (strong hash state).

When the weak hash value satisfies the slicing condition (Equation 2), the reset point is found:

i) If this is a first context calculation reset point, save it to a portion of strong intensity state hash value hash (partial strong hash value, abbreviated as pshv), the reset state of strong hash;

ii) If it is not the first, then a new slice is divided, the slice strong hash value (strong Hash Value of Slices) as the hash value of the slice, saved to the array; and iii) The update s is the next byte after the end of the slice, and returns to step b).

d) When all the data blocks in the currently input data are calculated, that is, s points to the end of the data block, the data between the last reset point and the end position of the data block is called right truncated data, and the strong hash value of the part is recorded as the strong hash state (strong hash state, abbreviated as shs).

When a strong hash value is calculated using a matrix multiplication operation as a strong hash function, the hash value of the binary stream data stream can be expressed as a hash value that can be expressed as an n-th order matrix per bit or a specific number of bits, and the mapped matrices are multiplied in the order in which they appear in the data stream.

The criterion for the reset point in the data stream is that a weak hash value is calculated every w bytes, and when the obtained weak hash value satisfies the slicing condition, it is a reset point (reset point).

Base on the starting offset of the input data block, the interval index in the SFH handle finds the calculation context of its left neighbor. The input data may be continuous before input, or may be input discontinuous, that is, unordered. Interval index is a data structure that can search for data intervals (start and end offsets). It can be implemented with any common lookup structure, such as interval tree, linked list, array, heap, and red-black tree. If the data block has no left neighbors (when the offset is 0 or unordered), then a new SFH context is initialized. The calculation context refers to the data structure used to describe any of the input data blocks. SFH context of the update operation, is calculated according to the data start offset and end offset stored in the index interval (e.g., interval trees, linked lists, etc.).

In the embodiment of the present invention, a strong strong hash value is calculated by using a new strong hash function, that is, a matrix multiplication operation of Galois Field. It has the property of satisfying the combination law but not satisfying the commutative law, and the calculation of the data before the slice can be calculated as a matrix product. It is the basis for reducing the adaptive adjustment of the required memory and the generated summary length during the summary calculation process.

The format of the strong hash function is as follows:
Defining initial matrices A, B:

$$A = \begin{pmatrix} X & 1 \\ 1 & 0 \end{pmatrix} B = \begin{pmatrix} X & X+1 \\ 1 & 1 \end{pmatrix}, \quad \text{eqn. (3)}$$

wherein X is $F_{2^n}$ an irreducible n-order determinant in the domain (near generation algebra). In the implementation example, n is 8, $F_2^n$ domain is:

$F_{2^n} = x^8 + x^4 + x^3 + x^2 + x^1$

The mapping relationship is defined as:

$\pi = \{0,1\} \rightarrow \{A, B\}$ $0 \rightarrow A$ $1 \rightarrow B$, wherein strong hash value for binary streaming data $x_1 x_2 L\ x_k$ is expressed as $\pi(x_1)\pi(x_2)K\pi(x_k)$.

With the new strong hash algorithm, each bit in the file is mapped to a second-order matrix; adjacent bits within the slice, through matrix multiplication on the Galois field, whose product is also a second-order matrix, as the strong hash value for each reset point. The second order matrix is a 32 bits integer spliced from 4 elements. The last 6 bits are intercepted and mapped to a character in a 64 character spaces (as an example: ABCDEFGHIJKLM-NOPQRSTUVWXYZabcdefghijklm-nopqrstuvwxyz0123456789+/), as one byte in the summary string. In order to speed up the calculation of matrix multiplication, a second-order matrix corresponding to each byte (8 bits) can be pre-computed and recorded to form a multiplication table of 256 entries, and the actual calculation is performed in units of bytes.

B) Merging operation, the interval index is judged as two adjacent computation contexts, and the right neighbor n of p and p are merged. The specific process is as follows:

a) Performing an update operation on w−1 bytes of p and n stored in the buffer;

b) Calculating the matrix product of the strong hash state value shs of p and the partial strong hash value p shy of n;

c) If the reset point is not included in p, the strong hash state value shs of p is updated by the matrix product; otherwise, the partial strong hash state value p shy of p is updated by the matrix product;

d) Splicing the strong hash values of p and n updated by step c) using matrix multiplication.

When the number of strong hash values is recorded in the SFH handle, the tuning operation is performed when the number exceeds the expected summary length after the data block is updated. The length of the summary is the length of the final summary string. If it is too long, it will increase the overhead of summary comparison and storage. The traditional fuzzy hash algorithm obtains a suitable summary length by multiple iterations, so that the time complexity of the entire summary calculation reaches O(n log n), and the present invention adjusts the summary length by the tuning operation, and the time complexity is reduced to 0(n). Using Equation 4, the slice parameter blocksize in Equation 2 can be adjusted to k*blocksize, thereby to select a new slice position. Strong hash values between new slice locations are merged by a matrix multiplication.

$rh \bmod(k^*b) = k^*b - 1 \Rightarrow r \bmod b = b - 1 \quad \text{eqn. (4)}$

The fourth step is to generate a hash value. A hash value is generated after the file transfer is complete, the transfer is terminated, or a certain length is entered.

Figure 3:
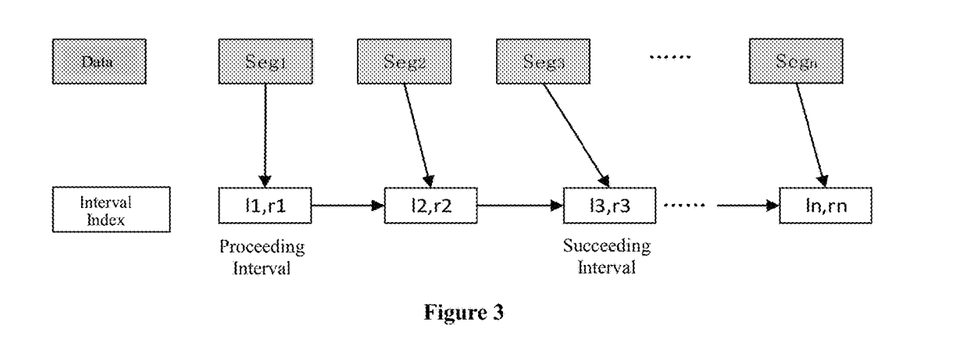
FIG. 3 is a flowchart for the method of generating summary in accordance to some embodiments of the present invention.

When the end condition is satisfied is calculated, traversing interval index, wherein the hash value and outputs stitching, shown in FIG. 3. In Seg 1, Seg 2 . . . , Seg n, each Seg represents a computational context. [l1, r1], [l2, r2] . . . , [ln, rn] each represents an interval in the interval index. The strong hash value of each slice is an n-order matrix. Each element in the matrix is an m-bit value, and the n*n elements of the matrix are spliced to form a value of n*n*m bit. Then by intercepting or mapping into one or more bytes of characters, the output form is similar to abcd1234[0:30000], and the square brackets are the offset information of the data for calculating the summary.

Figure 4:
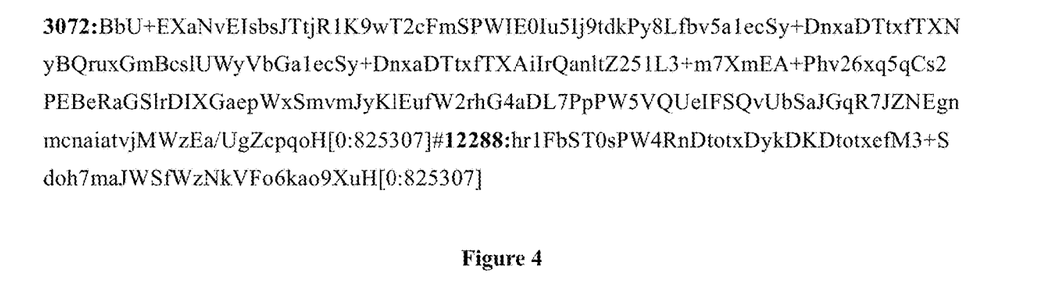
FIG. 4 is a schematic illustration of the form of the output hash value in accordance to some embodiments of the present invention.

For example, the strong hash value of each slice in this embodiment is a second-order matrix, and the four elements of the matrix are spliced to form a 4n bit value, and then the intercepted and mapped to a visible character. The symbol #separates the hash values blocksize and k*blocksize before and after the last tuning, as shown in FIG. 4.

For each Seg i, its weak hash value and strong hash value are computed byte by byte, and the original data is converted into a context stored in the interval index.

The total size of 149 GB, the data set contains 7998 files as an example. Consistent with the present invention has been tested in both cases the input scrambled sequence and inputs the calculated summary results. For ordered data, the calculation takes 52 min, speed is about 47.75 MB/s, the peak memory usage 1.25 kB; for unordered data, the calculation takes 57 min, rate of about 43.8 MB/s, the peak memory usage 310 kB. Overall, the performance meets the needs of the actual application.

In the fifth step, the calculated hash value $s_1$ is matched with the hash value $s_2$ in the summary list with the set of target files to be matched.

Since the file captured in the network traffic may be missing, that is, the starting offset of the input data is not continuous with the previous data, the i-th defect is filled with $n_i$ spaces. $n_i$ is estimated using Equation 5. $s'_1$ obtained after filling. Then Equation 6 is used to calculate the edit distance between the two (LE stands for Levenshtein distance), and finally use Equation 7 to evaluate the similarity of the two using a score of 0~100. The higher the score, the more similar, and the 100 represents complete similarity. Multiple summaries in the target file set to be matched can be compared one by one, or by establishing an index to increase matching speed. For example, the file length can be used to build an index, only the summaries of similar length are compared. Or, n-gram is sued builds an index that compares only the sum of public n-grams above a certain threshold. In general, if the similarity score is calculated to exceed 80, it can be considered a hit (that is, a file in the target file collection is hit. If there is a similar file in the target file collection, the input file may hit multiple times.). In practice, the threshold of similarity is adjusted according to the actual situation.

$$n_i = \left\lfloor \frac{Gapbytes[s_1]}{ComputedBytes} \right\rfloor, \quad \text{eqn. (5)}$$

$$e(s_1, s_2) = LE(s'_1, s_2) - \frac{|s_1|(|s'_1| - |s_1|)}{|s'_1|}, \quad \text{eqn. (6)}$$

-continued $$M = 100 - \frac{100 e(s_1, s_2)}{|s'_1| + |s_2|}.$$ eqn. (7)

In actual use, as compared ssdeep, sdhash, tlsh three algorithms, the presently disclosed methods have the ability to calculate scrambled data streams, not at the expense of speed calculation, recall rate accuracy. The test data is the international public data set t5, which has a total size of 1.8 GB and contains 4457 files. The file categories are shown in Table 1:

TABLE 1

Classification of international public dataset t5 files

| Format | Quantity | Total Size (MB) |
|---|---|---|
| doc | 533 | 219.9 |
| gif | 67 | 13.9 |
| html | 1093 | 68.4 |
| jpg | 362 | 53.9 |
| pdf | 1073 | 603.5 |
| ppt | 368 | 351.9 |
| text | 711 | 234.2 |
| xls | 250 | 277.5 |
| Sum | 4457 | 1823.1 |

Test methods using well-known techniques, participate comparison algorithm using three tests (July 2017) the latest version of the software download the following address:

Ssdeep v2.13 sdhashv3.41

TLSH v3.7.0

The above source code uses gcc/g++—O2 to compile parameters and is performed in the same soft and hard environment (the CPU used is Intel Xeon E5-2698 v3 2.30 GHz, operating system Linux RedHat 7.2). The test results are shown in Table 2:

TABLE 2

Accuracy, recall, and speed comparisons of different algorithms in network traffic testing

| | Threshold | True Positive | False Positive | Precision | Recall | Speed (MB/s) |
|---|---|---|---|---|---|---|
| TLSH | 20 | 146 | 95 | 60.6% | 57% | 12 |
| Sdhash | 80 | 109 | 16 | 87.2% | 42.6% | 30 |
| ssdeep | 80 | 126 | 14 | 90% | 49.2% | 59 |
| SFH (Invention) | 80 | 166 | 17 | 90.1% | 60.5% | 68 |
| All (Sum of True Positives and False Positives of all algorithms) | — | 256 | 131 | — | — | — |

As shown in Table 1, the method of the present invention is superior not only in accuracy but also in recall rate. Moreover, the present invention also has obvious advantages in speed, leading the second place by more than 10%.

What is claimed is:

1. A method for generating a summary, comprising:
 1) searching an interval index in a calculation handle to find a calculation context in a left neighbor of an input data block; and if the data block has no left neighbor, initializing a new calculation context;
 2) retaining first w-1 bytes of the input data block into a buffer in the calculation context, resetting a first hash state associated with a first hash function using a rolling hash computation and resetting a second hash state associated with a second hash function using a matrix multiplication operation of Galois Field, and calculating a first hash value for each byte of the input data block from the first hash state and updating the second hash state, wherein w is a sliding window value of the first function;
 3) finding a reset point when the calculated first hash value satisfies a slicing condition; if a first reset point is found in the calculation context, saving the second hash state to a partial second hash value, resetting the second hash state; if it is not the first reset point, calculating a second hash value of a slice divided by two reset points, until end of slicing; calculating a second hash state of the data between a last reset point and an end position of the input data block, completing updating of the calculation context;
 4) saving the updated calculation context in the interval index, find the computation context of already entered data in the interval index, and merging adjacent calculation contexts; and
 5) traversing the interval index, and splicing and outputting the second hash values and first hash values.

2. The method of claim 1, wherein each file used in the calculation context in step 1) is assigned a separate Stream-Fuzzy-Hash calculation handle, which is used as state information of streaming calculation comprising the interval index, wherein the interval index refers to a data structure configured to look up a data interval.

3. The method of claim 1, wherein in step 2), the second hash state is updated by Galois Field matrix multiplication, comprising:

defining initial matrices, A, B:

$$A = \begin{pmatrix} X & 1 \\ 1 & 0 \end{pmatrix} B = \begin{pmatrix} X & X+1 \\ 1 & 1 \end{pmatrix},$$

wherein X is $F_{2^n}$ an irreducible n-order determinant in the domain (near generation algebra), wherein the mapping relationship is defined as:

$\pi = \{0,1\} \rightarrow \{A,B\}$ $0 \rightarrow A$ $1 \rightarrow B$ wherein second hash value of the binary streaming data $x_1 x_2 \ldots x_k$ is expressed as $\pi(x_1) \pi(x_2) \ldots \pi(x_k)$.

4. The method of claim 1, wherein after the context calculation is updated in step 3), if a second hash value of a recorded SFH handle exceeds a preset summary length, performing a tuning operation, comprising:

using equation (4) to adjust blocksize parameter in equation (2) as k*blocksize, thereby selecting a new slice position, and merging second hash values between new slice positions in accordance with matrix multiplication, $$rh \bmod blocksize = blocksize - 1 \qquad \text{eqn(2)}$$

$$rh \bmod(k*b) = k*b - 1 => r \bmod b = b - 1 \qquad \text{eqn(4)}$$

wherein rh is a first hash function, mod is a modulo operation, b is an abbreviation for blocksize, k is a natural number.

5. The method of claim 1, wherein step of merging adjacent calculation contexts in step 4) comprises:
4-1) updating w-1 bytes of a calculation context p and an associated right neighbor n stored in the buffer;
4-2) calculating a matrix product of a second hash state value shs of p and part of a second hash value pshv of n;
4-3) if p does not include a reset point, updating the status second hash value shs of p using the matrix product; otherwise, updating part of the status second hash state value pshv of n using the matrix product; and
4-4) splicing the second hash values of p and n updated in step 4-3).

6. The method of claim 4, wherein in step 4-4) the second hash value of each slice is a matrix of order n, wherein each element in the matrix has an m-bit value,
wherein the step of splicing includes:
splicing the n*n elements of the matrix to form a value of n*n*m bit; and
intercepting characters mapped to one or more bytes.

7. The method of claim 1, further comprising:
detecting network traffic based on a summary generated, comprising:
2-1) generating, in each of target file sets to be matched, a hash value based on steps 1)-5), and storing the hash value as a summary list of the target file set to be matched;
2-2) generating a hash value based on the summary generating method for the to-be-detected network packet parsed from the network traffic; and
2-3) matching the hash value generated in step 2) with the hash value in the summary list to complete detection of network traffic.

8. The method of claim 7, wherein in a virus detection scenario, a file to-be-detected is based on a transmission protocol, or is an email attachment, or is downloaded by HTTP, where the target file set to be matched is a sample of known viruses or a Trojan file.

9. The method of claim 7, wherein in an intrusion detection scenario, a control command or a script carried in a protocol including Telnet or FTP is used as a file to be detected, wherein the target file set to be matched is known control commands or scripts.

10. The method of claim 7, wherein in a data leakage prevention scenario, a format document including MS Word™ or MS Power Point™ or PDF™ is identified by a feature code of a file header, and is treated as a file is detected, wherein the set of target files to be matched is a document valuable to a user.

11. The method of claim 7, wherein in a network content review scenario, the data of the specific site based on a URL is selected as a file to be detected, or the file to be detected is identified according to the file feature, wherein the target to be matched is not needed, wherein a collection of files record user access behavior.

12. The method of claim 7, wherein in a digital forensics scenario, on the basis of identifying types of documents through feature codes of file headers, the image and the video are identified by extending the feature codes or relying on information in HTTP headers as a file to be detected, wherein the target document collection to be matched is digital files held by law enforcement agencies.

13. The method of claim 7, wherein in a digital copyright protection scenario, the multimedia data or the software installation package transmitted by a transmission protocol is used as the file to be detected, wherein the target file set to be matched is copyrighted data.

14. The method of claim 7, wherein step 2-3) includes:
2-3-1) filling the ith defect in the hash values $S_1$ generated in step 2-2) with $n_i$ spaces to obtain $S'1$,
wherein $n_i$ is calculates using:

$$n_i = \left\lfloor \frac{Gapbytes[s_1]}{ComputedBytes} \right\rfloor, \qquad \text{eqn. (5)}$$

wherein Gapbytes represents summary length of the defect, ComputedBytes is file length of the already input file, wherein $|S_1|$ is length of the hash value $S_1$;
2-3-2) calculating a corrected edit distance $e(S_1, S_2)$ of $S_1$ and $S_2$ using Equation 6:

$$e(s_1, s_2) = LE(s'_1, s_2) - \frac{|s_1|(|s'_1| - |s_1|)}{|s'_1|}, \qquad \text{eqn. (6)}$$

wherein LE is the editing distance, $|S'1|$ indicates the length of hash value $S'_1$, $S_2$ is a hash value in the summary list of the target file collection to be matched;
2-3-3) assessing similarity M of $S_1$ and $S_2$ using Equation 7 by a score between 0~100:

$$M = 100 - \frac{100e(s_1, s_2)}{|s'_1| + |s_2|} \qquad \text{eqn. (7)}$$

wherein a higher score represents higher similarity, a score of 100 represents being completely identical.

15. Apparatus for generating a summary, comprising:
a receiver; a memory; and a processor;
wherein the receiver is configured to receive data to be calculated,
wherein the memory is configured to store the received data to be calculated,
wherein the processor is configured to execute program instructions stored in the memory to perform the steps:
1) searching an interval index in the calculation handle to find a calculation context in a left neighbor of an input data block; and if the data block has no left neighbor, initializing a new calculation context;
2) retaining first w-1 bytes of the input data block into a buffer in the calculation context, resetting a first hash state associated with a first hash function using a rolling hash computation and resetting a second hash state associated with a second hash function using a matrix multiplication operation of Galois Field, and calculating a first hash value for each byte of the input data block from the first hash state and updating the second hash state, wherein w is a sliding window value of a first hash function;
3) finding a reset point when the calculated first hash value satisfies a slicing condition; if a first reset point is found in the calculation context, saving the second hash state to a partial second hash value, resetting the second hash state; if it is not the first reset point, calculating a second hash value of a slice divided by two reset points, until end of slicing; calculating a second hash state of the data between a last reset point and an end position of the input data block, completing updating of the calculation context;

4) saving the updated calculation context in the interval index, find the computation context of already entered data in the interval index, and merging adjacent calculation contexts; and 5) traversing the interval index, and splicing and outputting the second hash values and first hash values.

* * * * *